(12) United States Patent
Serebrin et al.

(10) Patent No.: US 10,452,417 B2
(45) Date of Patent: Oct. 22, 2019

(54) METHODS, APPARATUS, AND ARTICLES OF MANUFACTURE TO VIRTUALIZE PERFORMANCE COUNTERS

(71) Applicant: VMware, Inc., Palo Alto, CA (US)

(72) Inventors: Benjamin Charles Serebrin, Sunnyvale, CA (US); Daniel Michael Hecht, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 377 days.

(21) Appl. No.: 14/721,461

(22) Filed: May 26, 2015

(65) Prior Publication Data

US 2015/0254087 A1    Sep. 10, 2015

Related U.S. Application Data

(62) Division of application No. 13/593,187, filed on Aug. 23, 2012, now Pat. No. 9,063,762.

(Continued)

(51) Int. Cl.
*G06F 9/455* (2018.01)
*G06F 11/34* (2006.01)

(52) U.S. Cl.
CPC .......... *G06F 9/45533* (2013.01); *G06F 9/455* (2013.01); *G06F 9/45558* (2013.01);
(Continued)

(58) Field of Classification Search
CPC .. G06F 11/3466; G06F 9/455; G06F 9/45533; G06F 9/45558;
(Continued)

(56) References Cited

U.S. PATENT DOCUMENTS 6,675,372 B1 * 1/2004 Damron ................ G06F 9/3836
712/E9.05
7,788,664 B1 * 8/2010 Janakiraman ....... G06F 9/45533
718/1

(Continued)

OTHER PUBLICATIONS

Du, Jiaqing, Nipun Sehrawat, and Willy Zwaenepoel. "Performance profiling of virtual machines." ACM SIGPLAN Notices 46.7 (2011): 3-14.*

(Continued)

*Primary Examiner* — Meng Ai T An
*Assistant Examiner* — Willy W Huaracha
(74) *Attorney, Agent, or Firm* — Hanley, Flight & Zimmerman, LLC

(57) ABSTRACT

Methods, apparatus, and articles of manufacture to virtualize performance counters are disclosed. An example method includes dividing performance events to be counted into a plurality of classes; assigning a first virtual performance counter of a virtual machine to a first performance event type in a first one of the classes; assigning a second virtual performance counter of the virtual machine to a second performance event type in a second one of the classes different from the first class; incrementing the first virtual performance counter in response to a first occurrence of the first performance event type during direct execution of guest instructions by the virtual machine; and not incrementing the first virtual performance counter in response to a second occurrence of the first performance event type during execution of emulated instructions by a hypervisor on behalf of the virtual machine.

20 Claims, 7 Drawing Sheets

Related U.S. Application Data

(60) Provisional application No. 61/527,728, filed on Aug. 26, 2011.

(52) U.S. Cl.
CPC ............... *G06F 11/3466* (2013.01); *G06F 2009/45591* (2013.01); *G06F 2201/815* (2013.01); *G06F 2201/86* (2013.01); *G06F 2201/88* (2013.01)

(58) Field of Classification Search
CPC ..... G06F 2009/45591; G06F 2201/815; G06F 2201/86; G06F 2201/88
USPC .......................................................... 718/1
See application file for complete search history.

(56) References Cited

U.S. PATENT DOCUMENTS

| | | | |
|---|---|---|---|
| 8,607,228 B2* | 12/2013 | Cota-Robles | G06F 11/3409 718/1 |
| 9,015,428 B2* | 4/2015 | Jorgensen | G06F 12/08 711/154 |
| 2008/0040715 A1 | 2/2008 | Cota-Robles et al. | |
| 2008/0163254 A1* | 7/2008 | Cota-Robles | G06F 9/45558 719/318 |
| 2012/0245897 A1* | 9/2012 | Bose | G06F 11/3024 702/186 |
| 2012/0278800 A1* | 11/2012 | Nicholas | G06F 9/45558 718/1 |
| 2013/0219389 A1 | 8/2013 | Serebrin et al. | |

OTHER PUBLICATIONS

Chen et al. "Taming hardware event samples for FDO compilation." Proceedings of the 8th annual IEEE/ACM international symposium on Code generation and optimization. ACM, Apr. 2010. pp. 42-52.*

"Intel 64 and IA-32 Architectures Software Developer's Manual vol. 3 (3A, 3B & 3C): System Programming Guide", Intel, May 2012 (1944 pages).

"BIOS and Kernel Developer's Guide (BKDG) for AMD Family 10h Processors", Advanced Micro Devices, Inc., AMD Family 10th Processor BKDG, Rev. 3.48, Apr. 22, 2010 (472 pages).

"What is Amd CodeAnalyst?", AMD CodeAnalyst Performance Analyzer, retrieved from <http://developer.amd.com/tools/codeanalyst/pages.default.aspx> URL first captured on web.archive.org on May 29, 2011 (2 pages).

Du et al., "Performance Profiling in a Virtualized Environment", USENIX, 2010 (6 pages).

Popek et al., "Formal Requirements for Virtualizable Third Generation Architectures", Association for Computing Machinery, Inc., vol. 17, No. 7, Jul. 1974 (10 pages).

Mousa et al., "VrtProf: Vertical Profiling for System Virtualization", IEEE, Proceedings of the 2010 43rd Hawaii International Conference on System Sciences, 2010 (10 pages).

Thomas Gleixner, "Performance Counters for Linux", LKML.org, Dec. 4, 2008 (4 pages).

Nikolaev et al., "Perfctr-Xen: A Framework for Performance Counter Virtualization", VEE'11, Mar. 9-11, 2011 (11 pages).

"Timekeeping in VMware Virtual Machines—VMware ESX 4.0/ ESCi 4.0, Vmware Workstation 7.0", VMware, Inc., 2010 (26 pages).

Du et al., "Performance Profiling of Cirtual Machines", VEE'11, Mar. 9-11, 2011 (12 pages).

"Boost Performance Optimization and Multicore Scalability on Windows and Linux", Intel VTune Amplifier XE, retrieved from <http://software.intel.com/en-us/articles/intel-vtune-amplifier-xe/> URL first captured on web.archive.org on Nov. 13, 2010 (4 pages).

United States Patent and Trademark Office, "Non-Final Office Action" issued in connection with U.S. Appl. No. 13/593,187, dated Aug. 14, 2014, 19 pages.

United States Patent and Trademark Office, "Notice of Allowance," issued in connection with U.S. Appl. No. 13/593,187, dated Feb. 26, 2015, 10 pages.

* cited by examiner

METHODS, APPARATUS, AND ARTICLES OF MANUFACTURE TO VIRTUALIZE PERFORMANCE COUNTERS

RELATED APPLICATION

This patent arises from a continuation of U.S. patent application Ser. No. 13/593,187, filed Aug. 23, 2012, now issued as U.S. Pat. No. 9,063,762, and claims priority to U.S. Provisional Patent Application Ser. No. 61/527,728, which was filed on Aug. 26, 2011. The entireties of U.S. patent application Ser. No. 13/593,187 and U.S. Provisional Patent Application Ser. No. 61/527,728 are incorporated herein by reference.

FIELD OF THE DISCLOSURE

This disclosure relates generally to virtualization and, more particularly, to methods, apparatus, and articles of manufacture to virtualize performance counters.

BACKGROUND

Virtualization is a method to encapsulate and abstract an operating system (OS) by running the OS in a virtual machine (VM). Virtualization has found uses in development, to isolate systems-under-test, Internet web serving, and in data centers, to provide server consolidation, migration, and manageability functions. Workloads are increasingly likely to be virtualized. Many companies are using remote desktop viewing products to replace developers' and users' dedicated desktop machines, thereby saving significant resources in hardware and network infrastructure investment.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
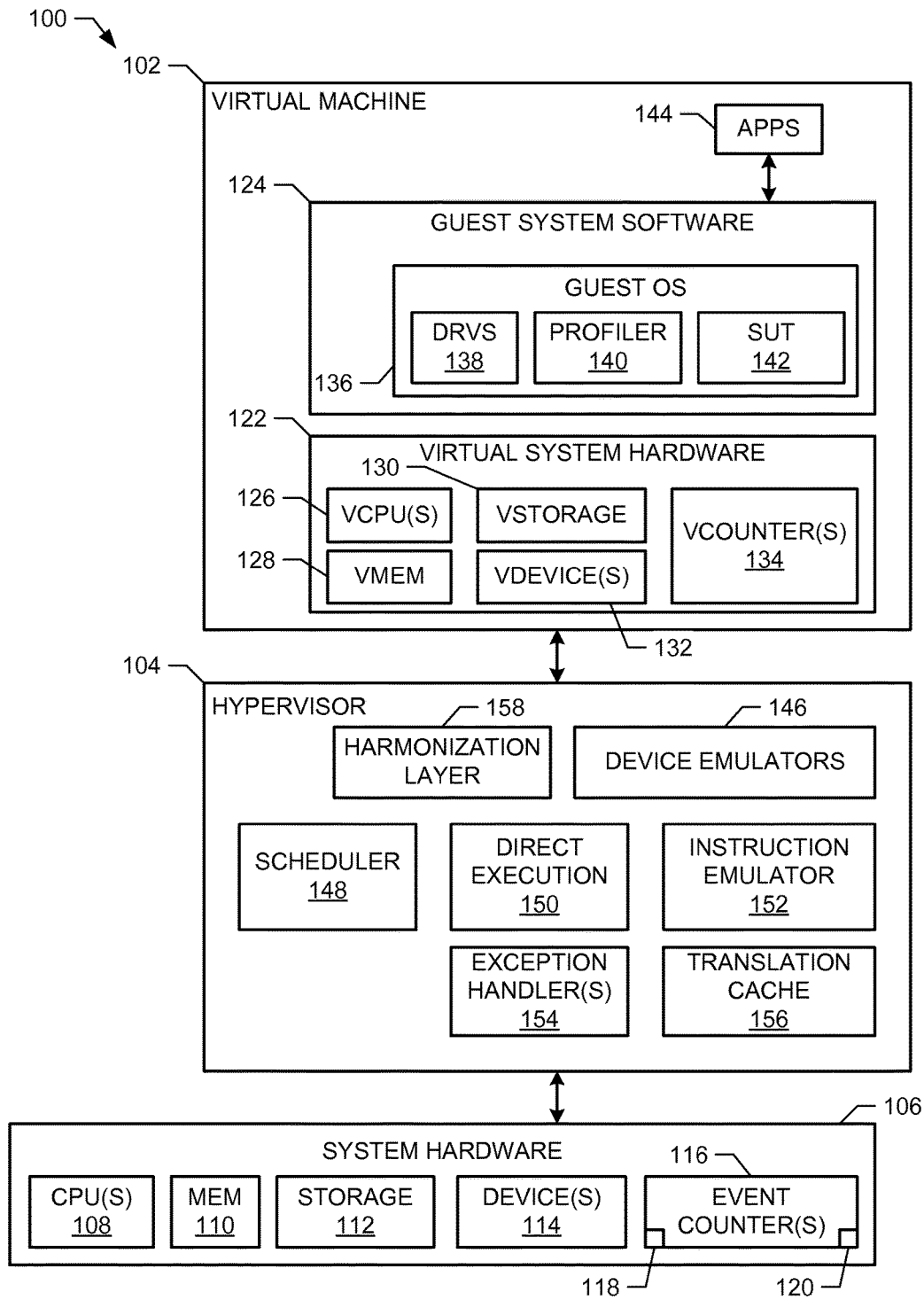
FIG. 1 is a block diagram of an example computer system including a hosted virtual machine to virtualize performance counters.

Example methods, apparatus, and articles of manufacture to virtualize performance counters are disclosed. Some example methods include scheduling a virtual machine (VM) on a processor core, incrementing a virtual performance counter in response to an occurrence of an associated speculative event during direct execution of guest instructions by the VM on the processor core, and incrementing the virtual performance counter in response to an occurrence of the associated speculative event during execution of emulated instructions by a hypervisor on behalf of the VM on the processor core.

Example apparatus disclosed herein include a hypervisor. The example hypervisor schedules a VM to execute guest instructions on a processor, increments a virtual performance counter in response to an occurrence of an associated speculative event during direct execution of guest instructions by the VM on the processor, executes second instructions to emulate a guest instruction on behalf of the VM, and increments the virtual performance counter in response to an occurrence of the associated speculative event during execution of the second instructions. The hypervisor may be implemented by the processor.

Example computer readable storage media include instructions which, when executed by a processor, cause the processor to schedule a VM on a processor core, increment a virtual performance counter in response to an occurrence of an associated speculative event during direct execution of guest instructions by the VM on the processor core, and increment the virtual performance counter in response to an occurrence of the associated speculative event during execution of emulated instructions by a hypervisor on behalf of the VM on the processor core.

In some examples, performance monitoring counters are a set of processor model specific registers (MSRs). In such examples, performance monitoring counters are used to monitor and measure various performance-related aspects of a CPU. Software developers may access the performance monitoring counters during development to tune performance of a software application. Some performance monitoring counters can be configured to count a particular event, while some counters are hardwired to count particular events. Example events include cache misses, cache hits, translation lookaside buffer misses, translation lookaside buffer hits, unhalted reference cycles, retired instructions, and branched instructions. Performance counters can be configured to raise an interrupt (e.g., to the processor core) when the event count reaches a threshold (e.g., overflows).

An RDTSC instruction, which returns a time stamp counter (TSC) of a processor, is a common source of total elapsed time in a computer.

The TSC counts the number of clock ticks since the TSC was reset. However, an instructions-per-cycle (IPC) calculation that uses RDTSC results for elapsed time as its denominator can potentially under-count the IPC because the TSC counter continues to run even when instructions are not executing, which would cause incorrect results in the calculation. Example methods, apparatus, and/or articles of manufacture disclosed herein enable more accurate measures of software performance while running in a virtualized environment than known methods of profiling software programs.

In some examples, a hypervisor virtualizes the performance monitoring counter capabilities of the processor cores of a CPU. Through virtualization of the counters, the example hypervisor enables modified and unmodified profiling tools to run within a VM as a way to analyze the performance of software running inside the VM. Such profiling tools include, for example, VMWare® "vmkperf" utility, Intel® VTune™, Linux® "perf" utility, and "oprofile."

In some disclosed examples, events are divided into two types: speculative and non-speculative. As used herein, speculative events are defined to include performance events that are subject to run-to-run variation. Such variation may be due to, for example, processor speculation, varying cache and branch predictor temperature, variable cache miss costs, and/or other non-deterministic effects. As used herein, non-speculative events include deterministic events and any other events that are not considered speculative events. For a given program execution, non-speculative events of retired instructions and branches can be expected to be repeatable and determined from an in-order execution of the program. For example, after a 3-instruction code loop that executes 1000 times, the non-speculative retired branch instruction event counter should report 1000 branches and the non-speculative retired instruction event counter should report 3000 instructions.

While two example types of events (e.g., speculative and non-speculative) are discussed, other divisions of events may additionally or alternatively be used. For example, events may be divided into time-based events and non-time based events. Example time-based events may include unhalted core cycles and unhalted reference cycles while non-time based events include any event that is not time-based (e.g., instructions retired). Any other divisions or distinctions between events may also be drawn. Furthermore, multiple divisions between events may be used. In some examples, a hypervisor determines the divisions dynamically and/or changes the divisions (e.g., in response to a request from a software profiler).

In some examples, a hypervisor filters events that a profiler (e.g., profiling software) might use in a ratio. For example, if the profiler mixes speculative and non-speculative events in the same ratio, the hypervisor permits speculative events to increment and does not permit the non-speculative events to increment while the hypervisor emulates guest instructions. Example ratios include TLB misses per retired instruction or TLB accesses per retired instruction. Although the hypervisor may not or cannot predict what events or counters a profiler might plan to use in a ratio, the example hypervisor assumes the use of non-speculative events or counters (e.g., retired instruction counters) implies the use of such a ratio. The example hypervisor may then pause non-speculative event counters (e.g., suppress incrementing of the speculative event counters, ignore speculative event counters, etc.) during emulation.

Many known datacenters perform CPU over-commitment using hypervisors by running multiple VMs on a single computer, where the total number of virtual CPUs (VCPUs) exceeds the total number of physical CPUs (PCPUs). Such overcommitment is achieved by sharing the resources of the underlying hardware between the multiple virtual machines. This time-sharing of physical resources provides each VCPU with a fraction of the total execution time available on the PCPU. To achieve sharing of hardware resources, the hypervisor of such known systems applies heuristics to enable guest operating systems to accurately keep track of absolute time, often called wall-clock time. The wall-clock of a guest operating system should keep up with the absolute (i.e., real) time. To achieve this, while a VM is de-scheduled, virtual timer devices that are used by the guest operating system for timekeeping are allowed to fall behind real time and then catch up faster than real time when the VM is rescheduled. Thus, over time, the wall-clock time of the VM tracks the real time. In contrast, software performance profilers are concerned with relative time differences over the short term, and generally count the time that a VCPU is scheduled on a PCPU.

Due to the tension between the different requirements of a timer device, example hypervisors described herein achieve a trade-off between keeping a guest's wall-clock time correct and giving relative time appropriate for profilers' use. In some such examples, the hypervisor uses a measure of core-cycles-not-halted as a hardware interface for timekeeping that may be used for profiling in a virtual environment. In some examples, the hypervisor defines core-cycles-not-halted as a proxy to count core clock cycles when the VCPU is in context on a PCPU (e.g., direct execution of VM instructions by the VCPU on the PCPU), and time spent by the hypervisor executing instructions on that VCPU's behalf (e.g., emulating privileged instructions).

By way of example, a performance metric that may be used to profile software is instructions-retired-per-core-cycle. The instructions-retired-per-core-cycle may be calculated by measuring instructions retired (a non-speculative event) using one performance counter and measuring core-cycles-not-halted (a speculative event) using another performance counter. Such example methods are useful in native systems, and are advantageously supported in disclosed methods, apparatus, and articles of manufacture disclosed herein. Thus, example methods, apparatus, and articles of manufacture disclosed herein enable profilers of software on native platforms to be effectively operated in virtualized environments while maintaining accurate results. Furthermore, the example methods, apparatus, and articles of manufacture disclosed herein enable the profiler to determine the effects of virtualization on the performance of software (e.g., relative to native execution).

Sharing hardware between VMs leads to other, less direct effects. Just as multiple processes may compete for cache and/or other resources, multiple VCPUs and/or other unrelated hypervisor threads that share a processor core can pollute each other's caches, branch predictors, TLBs, and/or other microarchitectural state variables. Example methods, apparatus, and articles of manufacture disclosed herein do not attempt to condition counters on hardware sharing to avoid these effects, thereby avoiding creating difficulty for programmers of properly recalculating the non-sharing values of such dynamic counts. Avoiding conditioning of counters also avoids creating obstacles to appropriately showing the effects of sharing resources (e.g., in virtualized environments). For example, a program may not obviously be causing cache misses itself, but may still experience them in a time-shared machine. A programmer could benefit from knowledge of such effects. Knowledge of such effects is enabled by example methods, apparatus, and articles of manufacture disclosed herein.

FIG. 1 is a block diagram of an example system 100 to virtualize performance counters. The example system 100 includes a VM 102, which is managed by a hypervisor 104 (also referred to as a virtual machine monitor (VMM)). The example VM 102, also referred to herein as a "guest," is installed on a hardware system 106, which is also referred to herein as a "host." In some examples, one or more layers of system-level software, such as an operating system or similar kernel, operate on the system hardware 106 to host the hypervisor 104. Thus, the example hypervisor 104 may be a "hosted" hypervisor or a non-hosted hypervisor.

The example system hardware 106 of FIG. 1 includes one or more processors (e.g., central processing units (CPUs)) 108, memor(ies) 110, storage device(s) 112, and/or other devices 114 (e.g., a network adapter, an input device, an output device, optical storage, etc.).

The example system hardware 106 of FIG. 1 further includes event counters 116 to count performance-related events. The event counters 116 of the illustrated example include programmable counters 118 (e.g., counters that may be programmed to count desired events) and hardwired counters 120 (e.g., counters that count a specific type of event(s)). The example event counters 116 may be enabled and/or disabled. An example computing platform 800 that may be used to implement the system hardware 106 is described in detail with reference to FIG. 8 below.

The example VM 102 of FIG. 1 includes virtual system hardware 122 and guest system software 124. Any or all of the virtual hardware components 126-134 of the VM 102 may be implemented in software to emulate the corresponding physical components. The virtual system hardware 122 of FIG. 1 includes a virtual central processing unit (VCPU) 126, virtual memory 128, virtual storage 130, and virtual device(s) 132. One or more instances of the virtual central processing unit (VCPU) 126, the virtual memory 128, the virtual storage 130, and/or the virtual device(s) 132 may be included. The example virtual system hardware 122 further includes virtual performance counters 134 (also referred to herein as "virtual counters" and "virtual hardware counters"). The example virtual performance counters 134 of FIG. 1 appear to the guest system software 124 as hardware counters of the virtual CPU(s) 126 and/or as specialized hypervisor counters (e.g., counters available to profiler software that has been modified to profile software running in a virtualized environment).

The example guest system software 124 of FIG. 1 includes a guest operating system (OS) 136 and drivers (DRVS) 138 for the guest operating system 136 to interface with the virtual devices 132. In the example of FIG. 1, the guest system software 124 includes a profiler 140 to monitor performance counters. When operating on the VM 102, the profiler 140 monitors the virtual performance counters 134.

The example profiler 140 of FIG. 1 is provided with the code layout of a software program 142 to be tested (e.g., software-under-test (SUT)), and may integrate with an integrated development environment (IDE) programming environment such as Visual Studio® or Eclipse™. The profiler 140 of the illustrated example executes the software program 142 one or more times within the VM 102, and records the instruction pointer and/or the call stack information in place at the time a virtual performance counter 134 raises an interrupt. In some examples, the profiler 140 presents a visualization to a programmer of the average cost of a given function or instruction based on the recorded information. In some examples, the programmer may use this information to improve the performance of the software program 142 when executing in a virtualized environment.

To test the software 142 in a virtualized environment, a programmer runs the software 142 via the profiler 140. The profiler 140 of the illustrated example accesses the virtual counters 134 to measure the performance of the software 142. The programmer can iteratively apply adjustments (e.g., optimizations) to the software-under-test 142 based on performance measured by the profiler 140.

The example profiler 140 of FIG. 1 may operate in a sampling mode, in which one or more counted performance events are allowed to raise interrupts when the count has traversed a threshold. In some examples, the profiler 140 sets the threshold to achieve a desired approximate frequency of events, based on an estimated expected rate of events. For example, if 1,000 translation lookaside buffer (TLB) misses occur per second on average, and a 10 Hz sampling rate is desired, the virtual performance counter 134 that counts TLB misses is initialized to −100. In some examples, the profiler 140 is aware of the virtualization environment and provides the hypervisor 104 with one or more virtual counter specifications. The virtual counter specifications may include instructions on how the hypervisor 104 is to emulate the event counters 116 and/or what virtual counters 134 to provide (e.g., which speculative and/or non-speculative events to expose). For example, the profiler 140 may specify which of the virtual performance counters 134 are to be treated as speculative and which of the virtual performance counters 134 are to be treated as non-speculative. The example hypervisor 104 may then program the appropriate event counters 116 (e.g., by specifying particular bits of the event counters 116) to implement the speculative and/or non-speculative counters. In some examples, the profiler 140 may specify a first virtual performance counter 134 to count an event as speculative and a second virtual performance counter 134 to count the same event as non-speculative.

To profile the software 142, the profiler 140 executes instructions to access values in the virtual counter(s) 134. When a guest instruction accesses the virtual performance counter(s) 134, the example hypervisor 104 traps and emulates (e.g., via the instruction emulator 152) each MSR access by the virtual machine 102, largely unaltered, to the underlying event counter 116. When trapping and emulating a guest instruction, the hypervisor 104 prevents the trapped instruction from directly executing. Instead, the hypervisor 104 generates and executes substitute instructions to perform the guest instruction, and then returns the result to the virtual machine 102 as though the trapped instruction was executed. A virtual performance counter 134 that is configured to raise an interrupt (a trappable instruction) will cause the hypervisor 104 to enable the interrupt on the corresponding hardware event counter 116. When a hardware event counter 116 raises an interrupt (e.g., when the hardware event counter 116 value traverses a threshold), the example hypervisor 104 traps resulting event counter interrupt(s) and forwards the interrupt(s) to the virtual machine 102. The profiler 140 (or other software) receives the interrupt (delivered via the hypervisor 104) as though the interrupt originated from the virtual counters 134.

In some examples, the hypervisor 104 configures (e.g., program) the event counters 116 to count the same event(s) as the virtual performance counters 134, but to be programmatically limited to counting the event(s) when the CPU(s) 108 are executing instructions in the appropriate context (e.g., the event counters 116 programmed to count non-speculative events do not increment unless the CPU(s) 108 are executing in direct execution mode). The example virtual performance counters 134 may not be programmed with such a limitation, because the virtual performance counters 134 may be prevented from counting by the hypervisor 104 (e.g., via a context switch). The example hypervisor 104 may additionally or alternatively configure the hardware event counters 116 to enable the hypervisor 104 to share the event counters 116 with other hypervisor software.

The example VM 102 of FIG. 1 runs applications 144 as they would if run natively on a "real" computer (i.e., on hardware without an intervening VM), even though the applications are running at least partially indirectly (e.g., via the guest OS 136 and the virtual CPU(s) 126). Executable files may be accessed by the guest OS 136 from the virtual storage 130 or virtual memory 128. The virtual storage 130 and the virtual memory 128 are portions of the physical storage 112 or physical memory 110 allocated to the VM 102. Once an application 144 is installed within the VM 102, the guest OS 136 retrieves files from the virtual storage 130 just as if the files had been pre-stored as the result of a conventional installation of the application 144.

The example hypervisor 104 of FIG. 1 includes device emulators 146, a scheduler 148, a direct execution engine 150, an instruction emulator 152, exception handlers 154, a translation cache 156, and a harmonization layer 158.

The example device emulators 146 of FIG. 1 emulate hardware device(s) (e.g., to implement the virtual devices 132), such as the devices 114 included in the system hardware 106. The example device emulators 146 of FIG. 1 further emulate the event counter(s) 116 to provide the virtual counters 134. When the VM 102 is scheduled, stored values of the virtual counters 134 are restored to the event counters 116 from the context of the VM 102. When the VM 102 is de-scheduled, the values of the event counters 116 are stored with the context of the VM 102 to avoid conflicting with other VMs.

When the profiler 140 programs a virtual counter 134 (e.g., assigns an event to the virtual counter 134), the example device emulators 146 program a corresponding event counter 116 in the system hardware 106. Additionally, when the example profiler 140 requests a value from a virtual counter 134, the example device emulators 146 retrieve a value from the corresponding event counter 116 in the system hardware 106. When one or more of the event counter(s) 116 issue an interrupt to the processor (e.g., when one or more of the event counter(s) 116 traverse a count threshold), the example device emulator(s) 146 issue corresponding interrupt(s) from the appropriate virtual counter(s) 134 to the VCPUs 126. The interrupts are then handled by the example profiler 140 and/or the guest system software 124.

To provide virtualized performance counters 134 that provide an accurate representation of software performance in a virtualized environment, the example hypervisor 104 of FIG. 1 divides the virtual performance counters 134 into two types: speculative and non-speculative event counters. Speculative events include performance events that are subject to run-to-run variation. Such variation may be due to, for example, processor speculation, varying cache and branch predictor temperature, variable cache miss costs, and other non-deterministic effects.

During direct execution of instructions by the VM 102, the example hypervisor 104 of FIG. 1 increments the appropriate virtual performance counters 134 in response to non-speculative events. In contrast, during instruction emulation by the hypervisor 104 on behalf of the VM 102, the hypervisor 104 does not increment the virtual performance counters of non-speculative events. However, the example hypervisor 104 may increment virtual counters for non-speculative events when execution of the trapped instruction would result in such a non-speculative event. For example, the hypervisor 104 may increment a virtual counter 134 corresponding to retired instructions (a non-speculative event) in response to finishing emulation of an instruction for the VM 102. When the hypervisor 104 traps an instruction and prepares to execute on behalf of the VM 102 (e.g., due to emulated device access, guest timeslice expiration, and/or external events), the hypervisor 104 pauses the virtual counters 134 corresponding to the non-speculative events. When the hypervisor 104 resumes direct execution, the hypervisor 104 also resumes those virtual counters.

As a result, the example hypervisor 104 improves accuracy (e.g., correctness) of the counts associated with the software. For example, a single trapped and emulated instruction to be executed by the hypervisor 104 on behalf of the VM 102 appears to the VM 102 as a single retired instruction but may in fact require multiple instructions to be performed by the physical CPU 108. If non-speculative events, such as retired instructions, were counted during emulation of instructions by the hypervisor 104, the single guest instruction by the VM 102 on the VCPU 126 (which is trapped and emulated by the hypervisor 104) would appear to the profiler 140 to have been multiple retired instructions because the hypervisor 104 may retire multiple instructions to emulate the single guest instruction. As a result, the number of instructions retired and/or the number of instructions retired per core cycle may be overstated from the perspective of the VM 102.

On the other hand, the example hypervisor 104 increments the virtual counters 134 corresponding to speculative events regardless of whether the VM 102 is directly executing instructions or if the hypervisor 104 is trapping and executing instructions on behalf of the VM 102. Speculative events incurred during emulation by the hypervisor 104 are attributed to the instruction that required the emulation. Thus, the example hypervisor 104 provides the profiler 140 with a more accurate representation of the effects of virtualization on the software 142 than prior art systems because the computation costs of performing instructions (such as emulated instructions) in the virtualized environment may not be the same as the computation costs of performing those instructions in the native environment.

For example, a natively-executed "CPUID" instruction does not report TLB misses or cache misses. Emulation code executed by the hypervisor 104 performs incur memory accesses and is likely to induce both TLB events and cache events (e.g., speculative events). These TLB events and cache events are counted in the virtual counters 134 of the VM 102. Thus, the emulation code more accurately tracks these misses. In addition, the natively-executed CPUID instruction may have a total execution time of about 1000 cycles. However, the example hypervisor 104 increments the instructions retired event by one when emulating the CPUID instruction (e.g., to reflect the retirement of the CPUID instruction). During emulation of the CPUID instruction, the unhalted reference cycles (a speculative event) continue to count as long as the VM 102 remains scheduled, so that the hypervisor 104 consumes some of the scheduled cycles of the VM 102. For the CPUID instruction, the profiler 140 in the VM 102 would therefore calculate a performance for the software under test 138 of about 0.001 instructions per cycle during execution of the CPUID instruction (e.g., 1 instruction retired in 1000 cycles).

Advantageously, the result calculated by the profiler 140 is relatively stable even if the VM 102 is de-scheduled, since neither the virtual counters 134 for speculative events nor the virtual counters 134 for non-speculative events are incremented when the VM 102 is de-scheduled. When the VM 102 is de-scheduled during emulation, the virtual counters 134 of the illustrated example are paused. When the VM 102 is scheduled again, the virtual counters 134 of the illustrated example are restored and resume until the emulation is completed. The result is a relatively consistent number of instructions per cycle for the emulated instruction whether the emulation is performed contiguously or is broken up by de-scheduling, which provides the profiler 140 with a more accurate representation of performance of the software under test 142 than would be achieved by known systems.

The example scheduler 148 of FIG. 1 determines whether and when to schedule the VM 102 (e.g., the VCPUs 126) to execute on the CPUs 108. When the VM 102 is scheduled, the VM 102 executes instructions via the VCPUs 126, which are then executed on the CPUs 108. When the VM 102 is scheduled on a CPU 108, the example scheduler 148 restores values to the virtual counters 134 that were stored when the VM 102 was de-scheduled. When the VM 102 is de-scheduled, the example scheduler 148 of FIG. 1 stores the context of the VM 102 and pauses all execution of the VM 102, including pausing the virtual counters 134 and/or storing the values of the virtual counters 134 in the physical storage 112 and/or the physical memory 110.

The example direct execution engine 150 of FIG. 1 enables the instructions executed by the VCPUs 126 to be executed on the CPUs 108 on which the VCPUs 126 are scheduled. The direct execution engine 150 provides increased execution speed by enabling direct execution of instructions by the VM 102 on the CPUs 108 using a reduced intermediate layer. When the direct execution engine 150 is invoked for the VM 102, the example direct execution engine 150 enables the virtual counters 134 to increment the corresponding events.

In contrast to direct execution, the instruction emulator 152 of the illustrated example traps and emulates certain types of instructions (e.g., certain privileged instructions that the VM 102 is not permitted to execute directly on the system hardware 106). The example instruction emulator 152 of FIG. 1 decodes and emulates the instruction (e.g., by generating and executing alternative instructions), and resumes guest execution with the direct execution beginning at the next instruction. Example mandatory trapped instructions include IN and OUT instructions, page faults that are induced by lazy context evaluation in shadow or nested paging modes, and/or accesses to virtual devices.

For example, an instruction that returns an identification and/or statistics about the CPU would, if directly executed, return a value to the VM that may not be consistent with the values to be provided by the hypervisor 104. The example instruction emulator 152 traps these instructions to be executed by the VM 102 and translates the trapped instructions into instructions to implement the trapped instruction on the system hardware 106 (e.g., emulation instructions). The example translation cache 156 of the illustrated example caches instructions for access by the instruction emulator 152 (e.g., for looped emulated instructions). The instruction emulator 152 and the translation cache 156 of the illustrated example provide increased execution speed by emulating certain instructions from the VM 102, and prevent the VM 102 from directly executing certain privileged instructions.

In some examples, such as when the CPUs 108 do not include hardware virtualization support, the example hypervisor 104 accesses the translation cache 156 to execute privileged instructions. When executing via the translation cache 156, the example hypervisor permits speculative events to increment the virtual performance counters 134 via the event counters 116. As when the hypervisor 104 is emulating instructions, the hypervisor 104 may emulate non-speculative events when executing instructions via the translation cache 156 (e.g. they hypervisor 104 may increment the virtual performance counter(s) 134 programmed for instructions-retired for each guest instruction that has been retired by the translation cache code).

The example exception handler 154 of FIG. 1 assists with context-switching (e.g., scheduling and de-scheduling) between the VM 102 and other VMs on the computer system 100.

The example harmonization layer 158 of FIG. 1 enables transfer of the VM 102 to other computer systems (e.g., different physical hardware) and receipt of VMs from other computer systems (e.g., different physical hardware). The example harmonization layer 158 may implement, for example, VMotion™ technology available from VMware® to migrate VMs between multiple instances of system hardware. In some examples, the harmonization layer 158 converts one or more of the virtual counters 134 from counting a first type of processor performance event to a second type of processor performance event. For example, different generations of a physical processor and/or different families of processors may have architectural similarities and/or differences, including different implementations of event counters 116. The example harmonization layer 158 of FIG. 1 identifies a type (e.g., a model number) of the CPUs 108 and a type of a CPU of a system to which the VM 102 is to be migrated or from which the VM 102 is received. The example harmonization layer 158 of FIG. 1 converts one or more of the virtual counters 134 from counting a first hardware-specific performance event to counting a second hardware-specific performance event prior to storing or restoring the value of the converted event counter. Thus, the example harmonization layer 158 enables performance of the VM 102 to be measured even when the VM 102 is migrated between host computer systems.

The various virtualized hardware components in the example VM 102 of FIG. 1, such as the virtual CPU(s) 126, the virtual memory 128, the virtual storage 130, the virtual device(s) 132, and/or the virtual counters 134, are shown as being part of the VM 102 for the sake of conceptual simplicity. In some implementations, these components 126-134 are implemented as software emulations included in the hypervisor 104. One advantage of such an arrangement is that the hypervisor 104 may be, but are not necessarily, set up to expose "generic" devices, which facilitate VM migration and hardware platform-independence.

In some examples, the hypervisor 104 exposes (e.g., provides a virtual counter 134) synthesized events that are common to multiple hypervisor implementations, such as events that pertain to implementation of CPU emulations. For example, a shadow-paging hypervisor may expose the number of hidden page faults that required hypervisor intervention for events like accessed and dirty bit setting. In some examples, a hypervisor in any paging mode, including hardware-supported nested paging, can expose an event containing the number of hidden page faults due to lazy population of guest memory and/or copy-on-write collisions.

Some example hypervisors 104 may expose performance metrics for timeslicing the system 100. For instance, the virtual machine 102 may be interested in estimating the number of cycles stolen due to resource sharing (e.g., to understand video frame rates and/or other time-sensitive measurements). Other example timeslicing events that may be provided via the virtual counters 134 include storage (e.g., hard disk) events, hypervisor lock statistics, and/or non-uniform memory access (NUMA) migration counts.

In some examples, the hypervisor 104 provides a virtual counter 134 to emulate an event counter 116 that is in use by the system basic input/output system (BIOS) and/or platform software. For example, a fixed function cycles-not-halted counter may be emulated by measuring a reference time source (such as RDTSC) and scaling the reference time source by the differential ratio of APERF MSR/MPERF MSR (e.g., a ratio provided by the CPU to indicate the ratio of actual CPU cycles executed in a time period to the reference (fixed-frequency) rate of CPU cycles in the same time period). In some examples, the hypervisor 104 emulates counters used by a guest virtual machine for time calibration, which enables a hybrid mode in which time counters are emulated during a calibration mode of the guest virtual machine while other counters run directly in the hardware.

In some examples, the hypervisor 104 provides paravirtualized counters as virtual counters 134. Example paravirtualized counters include counters that are specific to virtualized environments (e.g., are not present in native execution environments), such as hypervisor-specific counters and/or virtualization-specific counters.

The example virtual counters 134 may additionally or alternatively be used to implement Precise Event-Based Sampling (PEBS) on Intel® architectures. When using PEBS, instead of raising an interrupt when the performance counter(s) 116 overflow (at which point software will collect some of the state of the CPU(s) 108), the CPU(s) 108 collect information representative of the state of the CPU(s) 108 when one of the event counters 116 overflow. The CPU(s) 108 store the information into a buffer (e.g., in the memory 110, in a buffer in the CPU(s) 108, etc.). In some examples, the CPU 108 collects the information for the CPU state when the VM 102 is directly executing and provides the information to the executing software. When the hypervisor 104 is emulating instructions for the VM 102, the example hypervisor 104 retrieves and modifies the PEBS sample in the PEBS buffer to refer to the state of the VCPU(s) 126 for the current guest instruction that is being emulated (e.g., rather than the physical CPU state).

Figure 2:
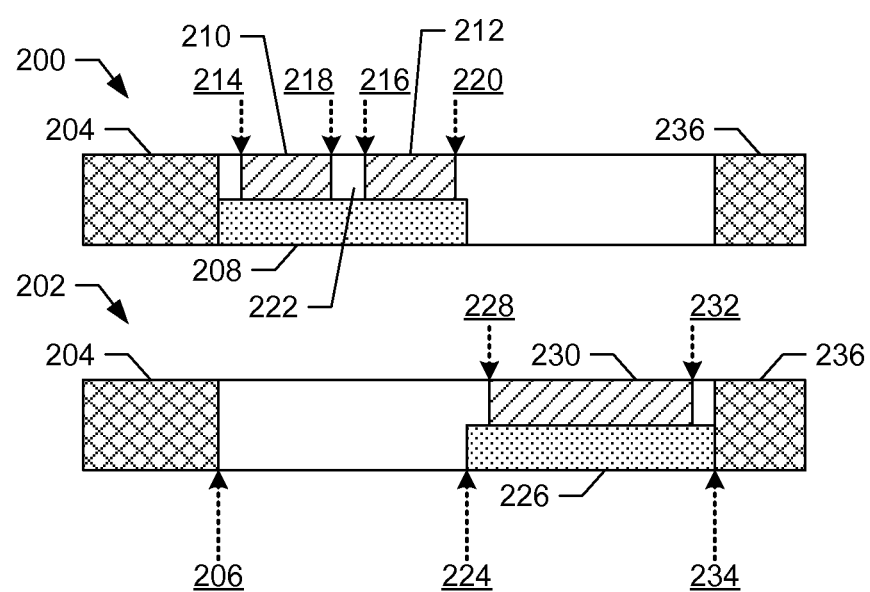
FIG. 2 illustrates an example timeline of virtual machine scheduling on physical processors of a host machine to virtualize performance counters.

FIG. 2 illustrates example timelines 200, 202 of VM scheduling on physical processors (e.g., the CPUs 108 of FIG. 1) of a host machine to virtualize performance counters. The example timeline 200 represents the available processing time for a first CPU core and the example timeline 202 represents the available processing time for a second CPU core, and will be described with reference to a single VM (e.g., the VM 102 of FIG. 1) and a corresponding hypervisor (e.g., the hypervisor 104 of FIG. 1). However, the CPU cores may be implemented to schedule multiple VMs. The term "timeline" refers to the available execution time of the processor cores represented by the example timelines 200, 202. The example of FIG. 2 will be described with reference to the example profiler 140 of FIG. 1 during profiling of a software program (e.g., the SUT 142 of FIG. 1). The example profiler 140 collects performance information for the SUT 142 that includes both speculative events (e.g., core-cycles-not-halted) and non-speculative events (e.g., instructions retired).

The example timelines 200, 202 of FIG. 2 run in parallel and, therefore, points on the respective timelines 200, 202 that are aligned in the up-down (i.e., vertical) direction of FIG. 2 occur simultaneously. Furthermore, the example timelines 200, 202 depicted in FIG. 2 represent an example span of time and may extend prior to and/or after the depicted span.

During a first time period 204 of the timelines 200, 202, the example VM 102 is not scheduled, and the VM 102 does not execute instructions (e.g., via direct execution or via emulation by the hypervisor 104). At a time 206, the example scheduler 148 schedules the VM 102 to execute on the first processor core associated with the timeline 200 and restores any stored virtual counter values to the virtual counters 134. During a time period 208, the example VM 102 is scheduled on the processor core associated with the timeline 200 and may execute instructions (e.g., directly and/or via emulation by the hypervisor 104). The example scheduler 148 further enables virtual counters 134 for speculative events. While the VM 102 is scheduled, the virtual counters 134 for speculative events are incremented in response to occurrences of the corresponding speculative events. Such speculative events provide a measure of the processing resources being consumed by the VM 102 to the profiler 140.

While the example VM 102 is scheduled (e.g., during the time period 208), the example VM 102 performs periods of direct execution 210, 212. Accordingly, at times 214 and 216, the example direct execution engine 150 enables virtual counters 134 for non-speculative events. When non-speculative events occur during the periods 210, 212, the corresponding virtual counters 134 for the non-speculative events are incremented. The virtual counters 134 for the non-speculative events provide a measure of the work being performed by the VM 102. During the direct execution periods 210, 212, the virtual counters 134 for speculative and/or non-speculative events increment in response to appropriate events. Non-speculative event counts may be combined with the speculative event counts to measure overall performance of the software 142.

At times 218 and 220, the example hypervisor 104 (e.g., via the instruction emulator 152) traps an instruction for emulation. The instruction emulator 152 (or the direct execution engine 150) then pauses the virtual counters 134 associated with non-speculative events. Accordingly, during a time period 222, the example instruction emulator 152 executes instructions on the CPU 108 on behalf of the VM 102, which causes the virtual counters 134 associated with speculative events to increment in response to speculative events but does not permit the virtual counters 134 associated with non-speculative events to increment.

Allowing the speculative events to increment the respective counters while not allowing non-speculative events to increment the non-speculative event counters more accurately reflects the performance of the software 142 during the time period 222. In the example of FIG. 2, processing resources are consumed on behalf of the VM 102 (e.g., measured via speculative event counters), but the VM 102 is not necessarily performing the work consuming the processing resources (e.g., reflected by pausing the non-speculative event counters). Thus, allowing the speculative events to increment the respective counters while not allowing non-speculative events to increment the non-speculative event counters increases an accuracy of performance measurements of software on the virtual machine by, for example, providing a measure of the effects of virtualization on the emulated instruction(s) performed during the time period 222.

At example time 224, the scheduler 148 de-schedules the VM 102 from the first processor core 200 and schedules the VM 102 on the second processor core 202. When the scheduler 148 de-schedules the VM 102, the example scheduler 148 pauses all of the virtual counters 134 and stores their values with the context of the VM 102 (e.g., to later restore the state(s) of the virtual counters 134 to continue measuring the performance of the software 142 on rescheduling of the VM 102). Pausing all of the virtual counters 134 reflects the fact that the VM 102 is not performing work and that no resources are being consumed on behalf of the VM 102. The example scheduler 148 then restores the context, including the values of the virtual counters 134, to the second processor associated with the second timeline 202 and enables the virtual counters 134 associated with speculative events. Furthermore, at the example time 224 the hypervisor 104 is emulating an instruction on behalf of the VM 102. Therefore, the example hypervisor 104 resumes the emulation with the same values in the virtual counter 134 when the VM 102 is scheduled on the second processor core associated with the timeline 202.

During a time period 226, the example VM 102 is scheduled on the second processor core associated with the timeline 202. At a time 228, the example VM 102 resumes direct execution, via the direct execution engine 150, for a time period 230. At time 232, the example hypervisor 104 (e.g., via the instruction emulator 152) traps an instruction for emulation. The instruction emulator 152 (or the direct execution engine 150) pauses the virtual counters 134 associated with non-speculative events. At example time 234, the scheduler 148 de-schedules the VM 102 from the processor core associated with the second timeline 202. When the scheduler 148 de-schedules the VM 102, the example scheduler 148 pauses all of the virtual counters 134 and stores their values with the context of the VM 102. During an example time period 236, the VM 102 is de-scheduled from the processor core associated with the second timeline 202.

While an example manner of implementing the hypervisor 104 has been illustrated in FIG. 1, one or more of the elements, processes and/or devices illustrated in FIG. 1 may be combined, divided, re-arranged, omitted, eliminated and/or implemented in any other way. Further, the example device emulators 146, the example scheduler 148, the example direct execution engine 150, the example instruction emulator 152, the example exception handlers 154, the example translation cache 156, the example harmonization layer 158 and/or, more generally, the example hypervisor 104 of FIG. 1 may be implemented by hardware, software, firmware and/or any combination of hardware, software and/or firmware. Thus, for example, any of the example device emulators 146, the example scheduler 148, the example direct execution engine 150, the example instruction emulator 152, the example exception handlers 154, the example translation cache 156, the example harmonization layer 158 and/or, more generally, the example hypervisor 104 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example device emulators 146, the example scheduler 148, the example direct execution engine 150, the example instruction emulator 152, the example exception handlers 154, the example translation cache 156, and/or the example harmonization layer 158 are hereby expressly defined to include a tangible computer readable medium such as a memory, DVD, CD, Blu-ray, etc. storing the software and/or firmware. Further still, the example hypervisor 104 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the hypervisor 104 of FIG. 1 are shown in FIGS. 3-7. In these examples, the machine readable instructions comprise program(s) for execution by a processor such as the processor 812 shown in the example computing platform 800 discussed below in connection with FIG. 8. The program may be embodied in software stored on a tangible computer readable medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3-7, many other methods of implementing the example hypervisor 104 may alternatively be used. For example, the order of execution of the blocks may be changed, and/or some of the blocks described may be changed, eliminated, or combined.

As mentioned above, the example processes of FIGS. 3-7 may be implemented using coded instructions (e.g., computer readable instructions) stored on a tangible computer readable medium such as a storage drive, a storage disc, a hard disk drive, a flash memory, a read-only memory (ROM), a compact disk (CD), a digital versatile disk (DVD), a Blu-ray disc, a cache, a random-access memory (RAM) and/or any other storage medium in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 3-7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage medium irrespective of the duration of storage and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 3:
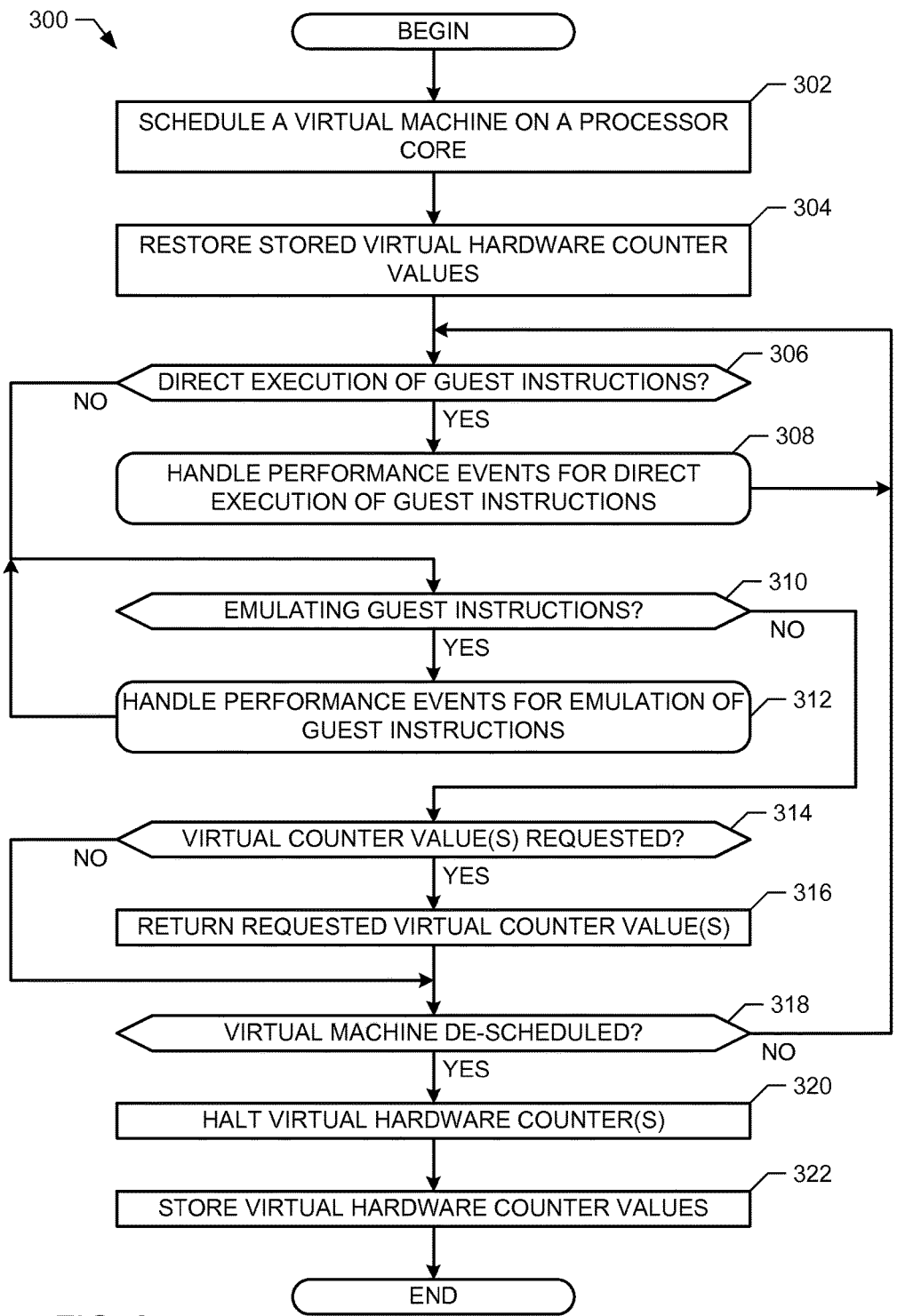
FIG. 3 is a flowchart representative of example machine readable instructions to implement the hypervisor of FIG. 1 to virtualize performance counters.

FIG. 3 is a flowchart representative of example machine readable instructions 300 to implement the hypervisor 104 of FIG. 1 to virtualize performance counters. The example instructions 300 of FIG. 3 may be performed when, for example, the hypervisor 104 is to schedule a VM (e.g., the VM 102 of FIG. 1) on a processor core (e.g., one of the physical CPUs 108 of FIG. 1).

The example instructions 300 begin by scheduling (e.g., via the scheduler 148 of FIG. 1) a VM 102 on a processor core (e.g., on one of the physical CPUs 108 of the system hardware 106) (block 302). The example scheduler 148 restores stored values for virtual hardware counters (e.g., the virtual counters 134 of FIG. 1) (block 304). In some examples, the scheduler 148 enables virtual counters 134 associated with speculative events and does not enable the virtual counters 134 associated with non-speculative events.

The example direct execution engine 150 of FIG. 1 determines whether guest instructions for the VM 102 are to be directly executed (block 306). For example, the direct execution engine 150 may determine that direct execution is appropriate when there are no trapped instructions to be executed. If guest instructions are to be directly executed (block 306), the example hypervisor 104 (e.g., via the device emulator 146 of FIG. 1) handles performance events for direct execution of guest instructions (block 308). A flowchart representative of example instructions 400 to implement block 308 is described below with reference to FIG. 4. After handling performance events for direct execution of guest instructions (block 308), control returns to block 306 to determine whether further guest instructions are to be directly executed.

If guest instructions are not to be directly executed (block 306), the example instruction emulator 152 of FIG. 1 determines whether guest instructions for the VM 102 are to be emulated (block 310). For example, the instruction emulator 152 may determine that emulation is appropriate when a guest instruction has been trapped. If guest instructions are to be emulated (block 310), the example hypervisor 104 (e.g., via the device emulator 146 of FIG. 1) handles performance events for emulation of guest instructions (block 312). A flowchart representative of example instructions 500 to implement block 312 is described below with reference to FIG. 5. After handling performance events for emulation of guest instructions (block 312), control returns to block 310 to determine whether further guest instructions are to be directly executed.

If guest instructions are not to be emulated (block 310), the example device emulator 146 determines whether virtual counter value(s) have been requested (block 314). For example, software executing in the VM 102 may request a value from one or more of the virtual counters 134. If any virtual counter value(s) have been requested (block 314), the example device emulator 146 returns the requested virtual counter value (block 316).

After returning the requested virtual counter value(s) (block 316), or if no request for virtual counter value(s) occurred (block 314), the example scheduler 148 determines whether the VM 102 is to be de-scheduled (block 318). If the VM 102 is to remain scheduled (block 318), control returns to block 306 to determine whether further instructions are to be directly executed and/or emulated.

If the VM 102 is to be de-scheduled (block 318), the example scheduler 148 halts the virtual hardware counters 134 (block 320). The scheduler 148 stores the virtual hardware counter values (block 322). For example, the scheduler 148 may store the values for the virtual counters 134 with a context of the VM 102. The example method 300 may then end and/or iterate to reschedule the VM 102 and/or to virtualize performance counters for VM 102.

Figure 4:
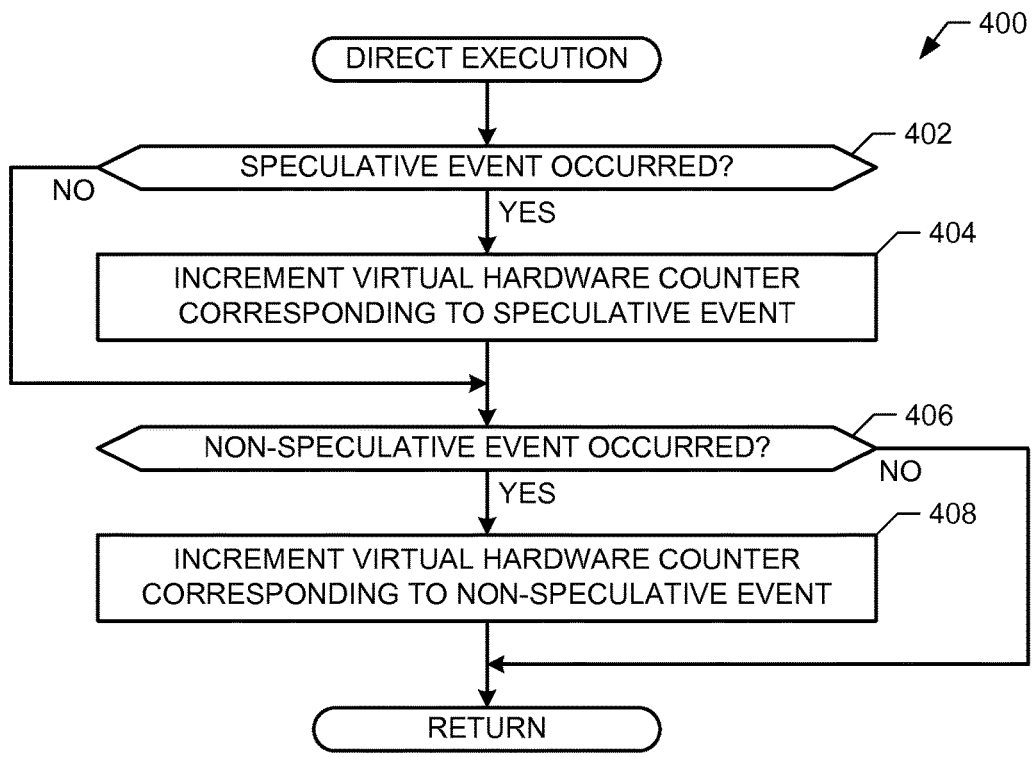
FIG. 4 is a flowchart representative of example machine readable instructions to implement the hypervisor of FIG. 1 to virtualize performance counters during direct execution of guest instructions.

FIG. 4 is a flowchart representative of example machine readable instructions 400 which may be executed to implement the hypervisor 104 of FIG. 1 to virtualize performance counters during direct execution of guest instructions. The example instructions 400 of FIG. 4 may implement block 308 of FIG. 3 in response to direct execution of guest instructions by the direct execution engine 150.

The example instructions 400 initialize when direct execution of one or more guest instructions by the VM 102 occurs. The example device emulator 146 of FIG. 1 determines whether a speculative event has occurred (block 402). If a speculative event has occurred (block 402), the example device emulator 146 of FIG. 1 increments a virtual hardware counter (e.g., a virtual counter 134 of FIG. 1) corresponding to the speculative event (block 404). For example, one of the virtual counters 134 may be assigned to the particular speculative event by the profiler 140 and/or by the device emulator 146. In some examples, block 404 may be executed in succession for multiple speculative events.

After incrementing the virtual hardware counter (block 404) or if a speculative event has not occurred (block 402), the example device emulator 146 determines whether a non-speculative event has occurred (block 406). If a non-speculative event has occurred (block 406), the example device emulator 146 of FIG. 1 increments a virtual hardware counter (e.g., a virtual counter 134 of FIG. 1) corresponding to the non-speculative event (block 408). For example, one of the virtual counters 134 may be assigned to the particular non-speculative event by the profiler 140 and/or by the device emulator 146. In some examples, block 408 may be executed in succession for multiple non-speculative events.

After incrementing the virtual hardware counter (block 408) or if a non-speculative event has not occurred (block 406), the example instructions 400 may end and return control to block 306 of FIG. 3. In this manner, the example instructions 400 may be repeatedly invoked while direct execution of instructions by the VM 102 is ongoing.

Figure 5:
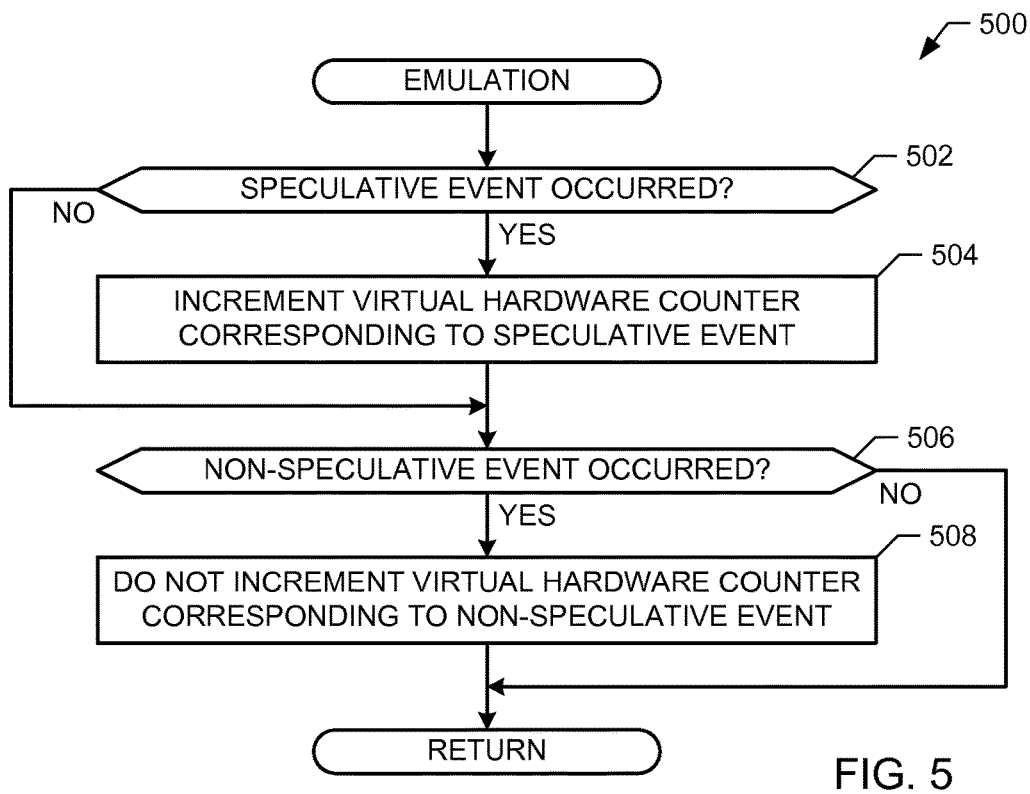
FIG. 5 is a flowchart representative of example machine readable instructions to implement the hypervisor of FIG. 1 to virtualize performance counters during emulation of guest instructions.

FIG. 5 is a flowchart representative of example machine readable instructions 500 which may be executed to implement the hypervisor of FIG. 1 to virtualize performance counters during emulation of guest instructions. The example instructions 500 of FIG. 4 may implement block 312 of FIG. 3 in response to emulation of guest instructions by the instruction emulator 152.

The example instructions 500 are called when emulation of one or more guest instructions by the VM 102 occurs. The example device emulator 146 of FIG. 1 determines whether a speculative event has occurred (block 502). If a speculative event has occurred (block 502), the example device emulator 146 of FIG. 1 increments a virtual hardware counter (e.g., a virtual counter 134 of FIG. 1) corresponding to the speculative event (block 504). For example, one of the virtual counters 134 may be assigned to the particular speculative event by the profiler 140 and/or by the device emulator 146. In some examples, block 504 may be executed in succession for multiple speculative events.

After incrementing the virtual hardware counter (block 504) or if a speculative event has not occurred (block 502), the example device emulator 146 determines whether a non-speculative event has occurred (block 506). If a non-speculative event has occurred (block 506), the example device emulator 146 of FIG. 1 does not increment the virtual hardware counter (e.g., a virtual counter 134 of FIG. 1) corresponding to the non-speculative event (block 508). By not incrementing the counter 134 in response to the non-speculative event, the example device emulator 146 increases the accuracy of software performance measurements in the virtualized environment (e.g., by reducing or avoiding overstatement and/or understatement of performance). In some examples, blocks 506 and 508 are omitted to the same effect. In some other examples, the example device emulator 146 suppresses incrementing of the corresponding virtual counter 134.

After not incrementing (or, alternatively, suppressing the incrementing of) the virtual hardware counter (block 508) and/or if a non-speculative event has not occurred (block 506), the example instructions 500 end and return control to block 310 of FIG. 3. In this manner, the example instructions 500 may be repeatedly invoked while direct execution of instructions by the VM 102 is ongoing.

Figure 6:
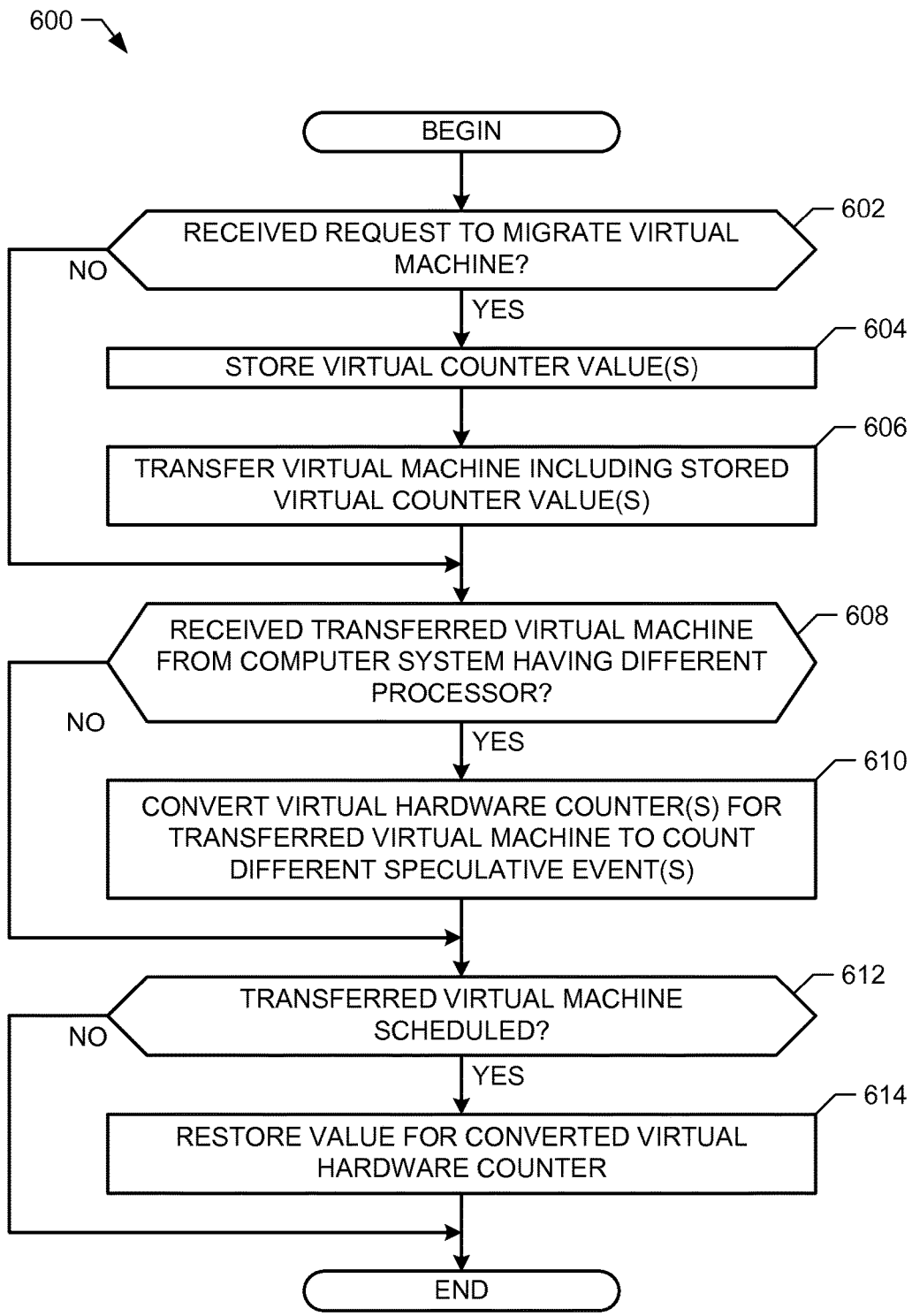
FIG. 6 is a flowchart representative of example machine readable instructions to implement the hypervisor of FIG. 1 to migrate virtualized performance counters with a migrated virtual machine.

FIG. 6 is a flowchart representative of example machine readable instructions 600 which may be executed to implement the hypervisor 104 of FIG. 1 to migrate virtualized performance counters with a migrated VM. The example instructions 600 may be invoked before, during, or after migration of a VM (e.g., the VM 102 of FIG. 1).

The example hypervisor 104 of FIG. 1 determines whether a request to migrate (e.g., transfer) a VM (e.g., the VM 102) has been received (block 602). For example, the hypervisor 104 may be instructed to migrate the VM 102 to another computing system. If a request to migrate the VM 102 has been received (block 602), the example harmonization layer 158 stores the virtual counter values (block 604). For example, the harmonization layer 158 may store the virtual counter values with a context of the VM 102, where the context is to be transferred with the VM 102. The example hypervisor 104 then transfers the VM 102 including the stored virtual counter values (block 606).

After transferring the VM 102 (block 606), or if a request to migrate the VM 102 has not been received (block 602), the example harmonization layer 158 determines whether a transferred (e.g., migrated) VM has been received from a computing system having a different physical CPU than the physical CPU 108 (block 608). If a transferred VM has been received from a computing system having a different physical CPU than the physical CPU 108 (block 608), the example harmonization layer 158 converts virtual hardware counter(s) for the transferred VM to count different speculative event(s) from the event(s) that the virtual hardware counter(s) were configured to count (block 610).

After converting the virtual hardware counter(s) (block 610), or if a transferred VM was not received (block 608), the example scheduler 148 determines whether a transferred VM is scheduled (block 612). If a transferred VM is scheduled (block 612), the example scheduler 148 restores values for any converted virtual hardware counter(s) (block 614). After restoring the value(s) (block 614), or if a transferred VM is not scheduled (block 612), the example instructions 600 may end and/or iterate to migrate additional VM(s).

Figure 7:
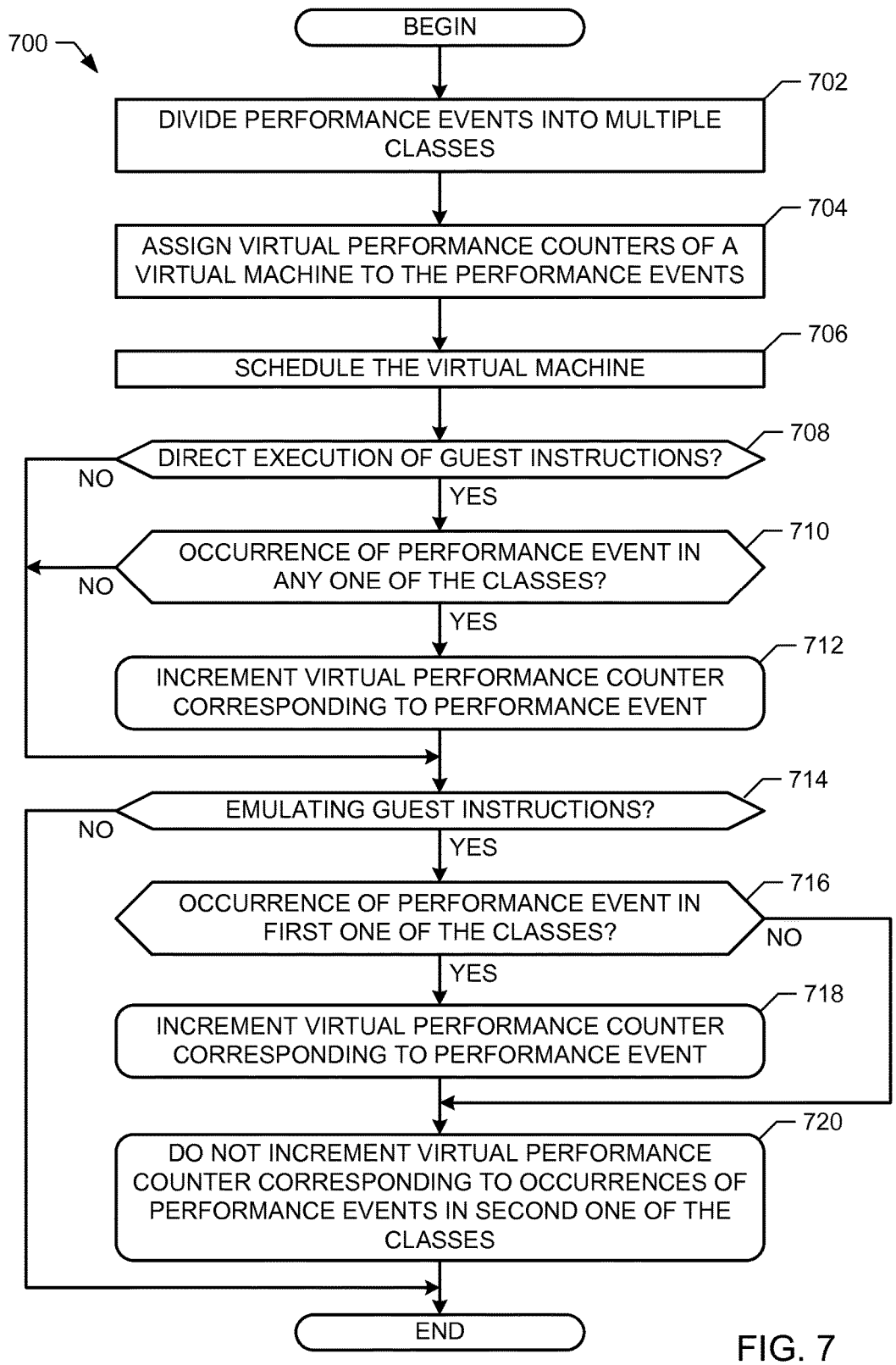
FIG. 7 is a flowchart representative of example machine readable instructions which may be executed to implement the example hypervisor of FIG. 1 to virtualize performance counters.

FIG. 7 is a flowchart representative of example machine readable instructions 700 which may be executed to implement the example hypervisor 104 of FIG. 1 to virtualize performance counters.

The example instructions 700 begin by dividing performance events into multiple classes (block 702). For example, the hypervisor 104 of FIG. 1 may divide performance events that can be counted by the event counters 116 of FIG. 1 into speculative and non-speculative events, time-based and non-time-based events, and/or any other division of performance events. The example hypervisor 104 assigns virtual performance counters of a VM (e.g., the virtual performance counters 134 of the VM 102 of FIG. 1) to the performance events (block 704). Thus, the hypervisor 104 assigns at least one virtual performance counter 134 to a performance event in a first one of the classes and assigns at least one virtual performance counter 134 to a performance event in a second one of the classes. The example hypervisor 104 schedules the VM 102 (e.g., to a CPU 108) (block 706).

The hypervisor 104 determines whether guest instructions are being directly executed (block 708). If direct execution is occurring (block 708), the example hypervisor 104 determines whether there has been an occurrence of a performance event in any one of the classes (block 710). If a performance event has occurred (block 710), the example hypervisor 104 increments a virtual performance counter 134 corresponding to the performance event (block 712).

After incrementing the virtual performance counter (block 712), if no performance events in the first class have occurred (block 710), or if guest instructions are not being directly executed (block 708), the example hypervisor 104 determines whether guest instructions are being emulated (e.g., by the hypervisor 104 on behalf of the VM 102) (block 714). If the guest instructions are being emulated (block 714), the example hypervisor 104 determines whether there has been an occurrence of a performance event in a first one of the classes (block 716). If a performance event in the first one of the classes has occurred (block 716), the example hypervisor 104 increments a virtual performance counter 134 corresponding to the performance event (block 718).

After incrementing the virtual performance counter 134 (block 718), or if a performance event in the first class has not occurred (block 716), the example hypervisor 104 does not increment virtual performance counters corresponding to occurrences of performance events in a second one of the classes (block 720). Thus, if a performance event in the second class occurs, the hypervisor 104 does not increment the corresponding virtual performance counter 134 and/or prevents the corresponding virtual performance counter 134 from incrementing.

If the hypervisor 104 determines that guest instructions are not being emulated (block 714), the example instructions 700 may then end. In some examples, the hypervisor 104 iterates blocks 708-720 while the VM 102 is scheduled to handle performance events in the multiple classes.

Figure 8:
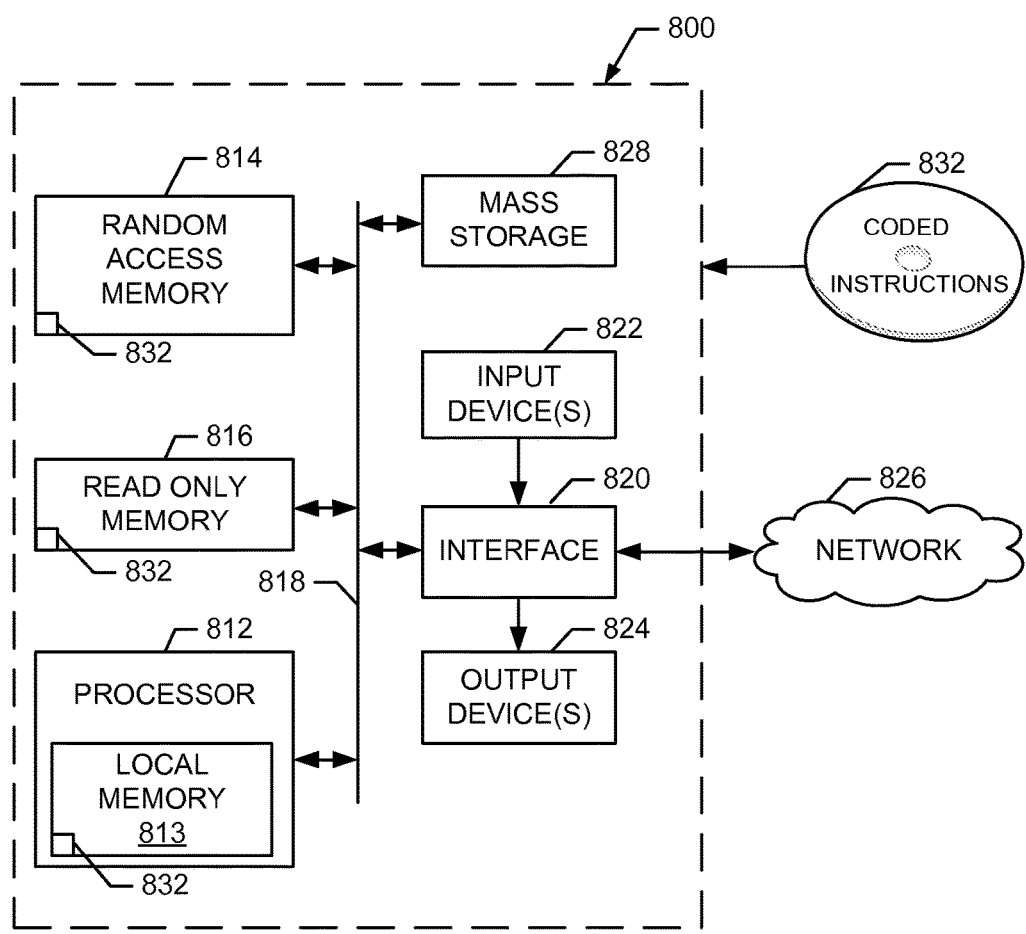
FIG. 8 is a block diagram of an example computing platform capable of executing the instructions of FIGS. 3-7 to implement the hypervisor and/or, more generally, the computer system of FIG. 1.

FIG. 8 is a block diagram of an example computing platform 800 capable of executing the instructions of FIGS. 3-7 to implement the VM 102, the hypervisor 104, the computer hardware 106 and/or, more generally, the computing system 100 of FIG. 1. The computing platform 800 can be, for example, a server, a personal computer, a mobile phone (e.g., a cell phone, a smart phone), a personal digital assistant (PDA), a tablet computer, or any other type of computing device on which a VM may be run.

The system 800 of the instant example includes a processor 812. For example, the processor 812 can be implemented by one or more microprocessors or controllers from any desired family or manufacturer. The example processor 812 may implement the physical CPUs 108 of FIG. 1.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. Any of the example memory 813, 814, 816 may implement the physical memory 110 of FIG. 1.

The computing platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card. Any of the example input devices 822 and/or output devices 824 may implement the devices 114 of FIG. 1.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The computing platform 800 also includes one or more mass storage devices 828 for storing software and data. Examples of such mass storage devices 828 include floppy disk drives, hard drive disks, compact disk drives and digital versatile disk (DVD) drives. The mass storage device 828 may implement the physical storage 112 of FIG. 1.

The coded instructions 832 of FIGS. 3-7 may be stored in the mass storage device 828, in the volatile memory 814, in the non-volatile memory 816, and/or on a removable storage medium such as a CD or DVD.

Example methods, apparatus, and articles of manufacture disclosed herein provide increased accuracy in measuring performance of software operating in virtualized environments. Example methods, apparatus, and articles of manufacture divide hardware events into speculative events that are representative of resources consumed on behalf of a VM and non-speculative events that are representative of work performed by the VM. The example methods, apparatus, and articles of manufacture permit virtual counters for speculative events to increment in response to occurrences of speculative events while the VM is scheduled. The example methods, apparatus, and articles of manufacture permit virtual counters for non-speculative events to increment when the VM is directly executing instructions and do not permit the virtual counters for non-speculative events to increment when the VM is not directly executing instructions (e.g., when the hypervisor traps and emulates an instruction). Thus, methods, apparatus, and/or articles of manufacture disclosed above provide a profiler with more accurate information regarding the effects of running in a virtualized environment, rather than running natively, on a software application. Such information is very useful to improving the performance of software designed to run in virtualized environments, such as in data centers.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to measure software performance in virtual environments, the method comprising:

classifying performance events to be counted into a plurality of classes including a time-based event class and a non-time-based event class, the time-based event class corresponding to at least one of unhalted core cycles or unaltered reference cycles, and the non-time based event class corresponding to at least a retired instruction or a branched instruction;

assigning a first virtual performance counter of virtual system hardware of a virtual machine to a first performance event type classified in the non-time-based event class;

assigning a second virtual performance counter of the virtual system hardware of the virtual machine to a second performance event type classified in the time-based event class;

incrementing the first virtual performance counter in response to an occurrence of the first performance event type classified in the non-time-based event class during direct execution of guest instructions by the virtual machine, the first performance event type corresponding to at least a retired instruction or a branched instruction;

executing, via a hypervisor, instructions trapped from the virtual machine to emulate the trapped instructions;

during execution of the trapped instructions by the hypervisor, pausing the first virtual performance counter to prevent incrementing the first virtual performance counter in response to an occurrence of the first performance event type classified in the non-time-based event class;

triggering a first interrupt when a first count of the first virtual performance counter reaches a first threshold; and determining a performance of software of the virtual machine based on the first interrupt.

2. A method as defined in claim 1, further including:

incrementing the second virtual performance counter in response to a first occurrence of the second performance event type classified in the time-based event class during direct execution of guest instructions by the virtual machine;

incrementing the second virtual performance counter in response to a second occurrence of the second performance event type classified in the time-based event class during execution of the trapped instructions by the hypervisor on behalf of the virtual machine;

triggering a second interrupt when a second count of the second virtual performance counter reaches a second threshold; and measuring the performance of the software of the virtual machine based on the second interrupt.

3. A method as defined in claim 2, wherein the incrementing the second virtual performance counter includes incrementing the second virtual performance counter of the virtual system hardware of the virtual machine in response to an unhalted core cycle occurrence during direct execution of the guest instructions by the virtual machine.

4. A method as defined in claim 2, wherein the incrementing the second virtual performance counter is incrementing the second virtual performance counter of the virtual system hardware of the virtual machine in response to an unhalted reference cycle occurrence during the direct execution of the guest instructions by the virtual machine.

5. A method as defined in claim 1, further including suspending the first virtual performance counter when the direct execution of the guest instructions ends.

6. A method as defined in claim 5, further including enabling the first virtual performance counter when the execution of the trapped instructions has finished and the guest instructions are subsequently directly executed by the virtual machine.

7. A method as defined in claim 1, wherein the trapped instructions are trapped from the virtual machine based on a privilege level associated with the trapped instructions.

8. A method as defined in claim 1, wherein the trapped instructions are trapped from the virtual machine due to executing emulation instructions that direct which instructions are to be trapped.

9. A method as defined in claim 8, wherein the emulation instructions direct which instructions are to be trapped based on at least one of IN and OUT instructions, page faults, or access to virtual devices.

10. A system to measure software performance in virtual environments including a processor, the system comprising:
virtual system hardware of a virtual machine;
a hypervisor to:
classify performance events to be counted into a plurality of classes including a time-based event class and a non-time-based event class, the time-based event class corresponding to at least one of unhalted core cycles or unaltered reference cycles, and the non-time based event class corresponding to at least a retired instruction or a branched instruction;
assign a first virtual performance counter of the virtual system hardware of the virtual machine to a first performance event type classified in the non-time-based event class;
assign a second virtual performance counter of the virtual system hardware of the virtual machine to a second performance event type classified in the time-based event class;
increment the first virtual performance counter in response to an occurrence of the first performance event type classified in the non-time-based event class during direct execution of guest instructions by the virtual machine, the first performance event type corresponding to at least a retired instruction or a branched instruction;
execute instructions trapped from the virtual machine to emulate the trapped instructions; and
during execution of the trapped instructions, pause the first virtual performance counter to prevent incrementing the first virtual performance counter in response to a n occurrence of the first performance event type classified in the non-time-based event class, the first virtual performance counter to trigger a first interrupt when a first count of the first virtual performance counter reaches a first threshold; and
a profiler to determine a performance of software of the virtual machine based on the first interrupt.

11. A system as defined in claim 10, wherein the hypervisor is to:
increment the second virtual performance counter in response to a n occurrence of the second performance event type classified in the time-based event class during the direct execution of the guest instructions by the virtual machine; and
increment the second virtual performance counter in response to an occurrence of the second performance event type classified in the time-based event class during the execution of the trapped instructions by the hypervisor, the second virtual performance counter to trigger a second interrupt when a second count of the second virtual performance counter reaches a second threshold, the profiler to measure the performance of the software of the virtual machine based on the second interrupt.

12. A system as defined in claim 11, wherein the second virtual performance counter is to be incremented in response to an unhalted core cycle occurrence during direct execution of guest instructions by the virtual machine.

13. A system as defined in claim 11, wherein he second virtual performance counter is to be incremented in response to an unhalted reference cycle occurrence during direct execution of guest instructions by the virtual machine.

14. A system as defined in claim 10, wherein the hypervisor is to suspend the first virtual performance counter when the direct execution of the guest instructions ends.

15. A system as defined in claim 14, wherein the hypervisor is to enable the first virtual performance counter when the execution of the trapped instructions has finished and the guest instructions are subsequently directly executed by the virtual machine.

16. A non-transitory computer readable storage medium comprising computer readable instructions which, when executed, cause a processor to at least:
classify performance events to be counted into a plurality of classes including a time-based event class and a non-time-based event class, the time-based event class corresponding to at least one of unhalted core cycles or unaltered reference cycles, and the non-time based event class corresponding to at least a retired instruction or a branched instruction;
assign a first virtual performance counter of virtual system hardware of a virtualized environment to a first performance event type classified in the non-time-based event class;
assign a second virtual performance counter of the virtual system hardware of the virtualized environment to a second performance event type classified in the time-based event class;
increment the first virtual performance counter in response to an occurrence of the first performance event type classified in the non-time-based event class during direct execution of guest instructions by the virtualized environment, the first performance event type corresponding to at least a retired instruction or a branched instruction;
cause a virtualization host to trap instructions from the virtualized environment and execute the instructions to emulate the trapped instructions;
during the execution of the trapped instructions by the virtualization host, pause the first virtual performance counter to prevent the first virtual performance counter from incrementing in response to a n occurrence of the first performance event type classified in the non-time-based event class;
trigger a first interrupt when a first count of the first virtual performance counter reaches a first threshold; and
determine a performance of software of the virtualized environment based on the first interrupt.

17. A non-transitory computer readable storage medium as defined in claim 16, wherein the instructions are further to cause the processor to:
increment the second virtual performance counter in response to a n occurrence of the second performance event type classified in the time-based event class during the direct execution of the guest instructions by the virtualized environment; and
increment the second virtual performance counter in response to a n occurrence of the second performance event type classified in the time-based event class during the execution of the trapped instructions by the virtualization host on behalf of the virtualized environment;
trigger a second interrupt when a second count of the second virtual performance counter reaches a second threshold; and measure the performance of the software of the virtualized environment based on the second interrupt.

18. A non-transitory computer readable storage medium as defined in claim 17, wherein the incrementing the second virtual performance counter includes incrementing the second virtual performance counter of the virtual system hardware of the virtualized environment in response to an unhalted reference cycle occurrence during direct execution of guest instructions by the virtualized environment.

19. A non-transitory computer readable storage medium as defined in claim 16, wherein the instructions are further to cause the processor to suspend the first virtual performance counter when the direct execution of the guest instructions ends.

20. A non-transitory computer readable storage medium as defined in claim 19, wherein the instructions are further to cause the processor to enable the first virtual performance counter when the execution of the trapped instructions has finished and the guest instructions are subsequently directly executed by the virtualized environment.

* * * * *

UNITED STATES PATENT AND TRADEMARK OFFICE
CERTIFICATE OF CORRECTION

PATENT NO. : 10,452,417 B2
APPLICATION NO. : 14/721461
DATED : October 22, 2019
INVENTOR(S) : Benjamin Charles Serebrin et al.

It is certified that error appears in the above-identified patent and that said Letters Patent is hereby corrected as shown below:

In the Claims

Column 22, Line 1:
Replace "he"
With --the--.

Signed and Sealed this
Thirty-first Day of March, 2020

Andrei Iancu
*Director of the United States Patent and Trademark Office*